(12) United States Patent
Chang

(10) Patent No.: US 7,706,081 B2
(45) Date of Patent: Apr. 27, 2010

(54) ZOOM LENS SYSTEM

(75) Inventor: Yu-Min Chang, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 153 days.

(21) Appl. No.: 12/025,122

(22) Filed: Feb. 4, 2008

(65) Prior Publication Data
US 2008/0247055 A1 Oct. 9, 2008

(30) Foreign Application Priority Data
Apr. 3, 2007 (TW) ............... 96111868 A

(51) Int. Cl.
G02B 15/14 (2006.01)
(52) U.S. Cl. .................. 359/687; 359/683
(58) Field of Classification Search .......... 359/687
See application file for complete search history.

(56) References Cited
U.S. PATENT DOCUMENTS 6,744,571 B2 *  6/2004  Ishii et al. ................ 359/795
6,975,462 B2 * 12/2005  Mihara ..................... 359/687
7,151,638 B2 * 12/2006  Ohashi ..................... 359/687
RE39,899 E   * 10/2007  Miyauchi .................. 359/687
7,372,635 B2 *  5/2008  Morooka et al. ........... 359/687
2004/0095653 A1 *  5/2004  Miyauchi .................. 359/687
2008/0180808 A1 *  7/2008  Hankawa et al. ........... 359/687

\* cited by examiner

Primary Examiner—Jordan M. Schwartz
(74) Attorney, Agent, or Firm—Thomas, Kayden, Horstemeyer & Risley

(57) ABSTRACT

A zoom lens system includes a first lens group, a second lens group, a third lens group, a fourth lens group, and an aperture stop, from an object side to an image side on an optical axis. The zoom lens system satisfies the following condition:

$$\frac{Y \times L}{2 \times f_W \times f_T} \le 1.06$$

where Y is a maximum diagonal length of the image side 170, L is a total track length of the zoom lens system 100, $f_W$ is a focal length of the zoom lens system 100 at a wide status, $f_T$ is a focal length of the zoom lens system 100 at a telephoto status.

18 Claims, 17 Drawing Sheets coma aberration

ZOOM LENS SYSTEM

RELATED APPLICATIONS

The application claims priority to Taiwan Application Serial Number 96111868, filed Apr. 3, 2007, which is herein incorporated by reference.

BACKGROUND

1. Field of Invention

The present invention relates to a lens system. More particularly, the present invention relates to a zoom lens system.

2. Description of Related Art

Cameras have undergone rapid development over the past years. Cameras are becoming smaller and compact. Therefore, the design of the lens system on cameras has become very important in recent years. There are two kinds of camera lens systems, fixed focal lenses and zoom lens. The zoom lens is a mechanical assembly of lens elements with the ability to vary its focal length for wield-angle and telephoto application, and commonly used with video, motion picture cameras, telescopes, and other optical instruments.

However, the cost and image quality of the zoom lens system can still be improved. Moreover, right now, portable electronic devices contain image capture devices. Hence, the zoom lens system must be more compact to reduce the size of the portable electronic devices.

Therefore, it is desirable to reduce the cost and size of the zoom lens system. Moreover, it is desirable to provide good image quality for optical instruments using with the zoom lens system.

SUMMARY

The current embodiment describes a zoom system sequentially assembled from an object side to an image side on a optical axis comprising a first lens group with positive optical power, a second lens group with negative optical power, a third lens group with positive optical power, a fourth lens group with positive optical power and an aperture stop. The first lens group consists of two unbound lenses with a predetermined distance between them. A fifth biconvex lens and a sixth biconcave lens make up the third lens group. The fifth biconvex lens is placed close to the object side and adhering to the sixth biconcave lens. The aperture stop is arranged between the second lens group and the third lens group. When the zoom lens system is zooming, the second lens group is moved toward the image side and the third lens group is moved toward the object side, the positions of the first lens group and the aperture stop on the optical axis are fixed.

According to one embodiment, a zoom lens system from an object side to an image side on an optical axis comprises a first lens group with positive optical power, a second lens group with negative optical power, a third lens group with positive optical power, and a fourth lens group with positive optical power. The first lens group has a first meniscus lens and a second convex lens. The first meniscus lens is placed close to the object side. The object side surface of the first meniscus lens curves outwardly toward the object side. The first meniscus lens and the second convex lens are arranged between a predetermined distance. The second lens group has a third concave lens and a fourth convex lens. The third concave lens is placed close to the object side. A fifth biconvex lens and a sixth biconcave lens make up the third lens group. The fifth biconvex lens is placed close to the object side and adhering to the sixth biconcave lens. The fourth lens group is composed of a seventh plastic lens. The seventh plastic lens has at least one aspheric surface.

The zoom lens system of the current embodiment satisfies the following condition:

$$\frac{Y \times L}{2 \times f_W \times f_T} \leq 1.06$$

where Y is the maximum diagonal length of the image side, L is the total track length of the zoom lens system, $f_W$ is the focal length of the zoom lens system in the wide status, $f_T$ is the focal length of the zoom lens system in the telephoto status.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
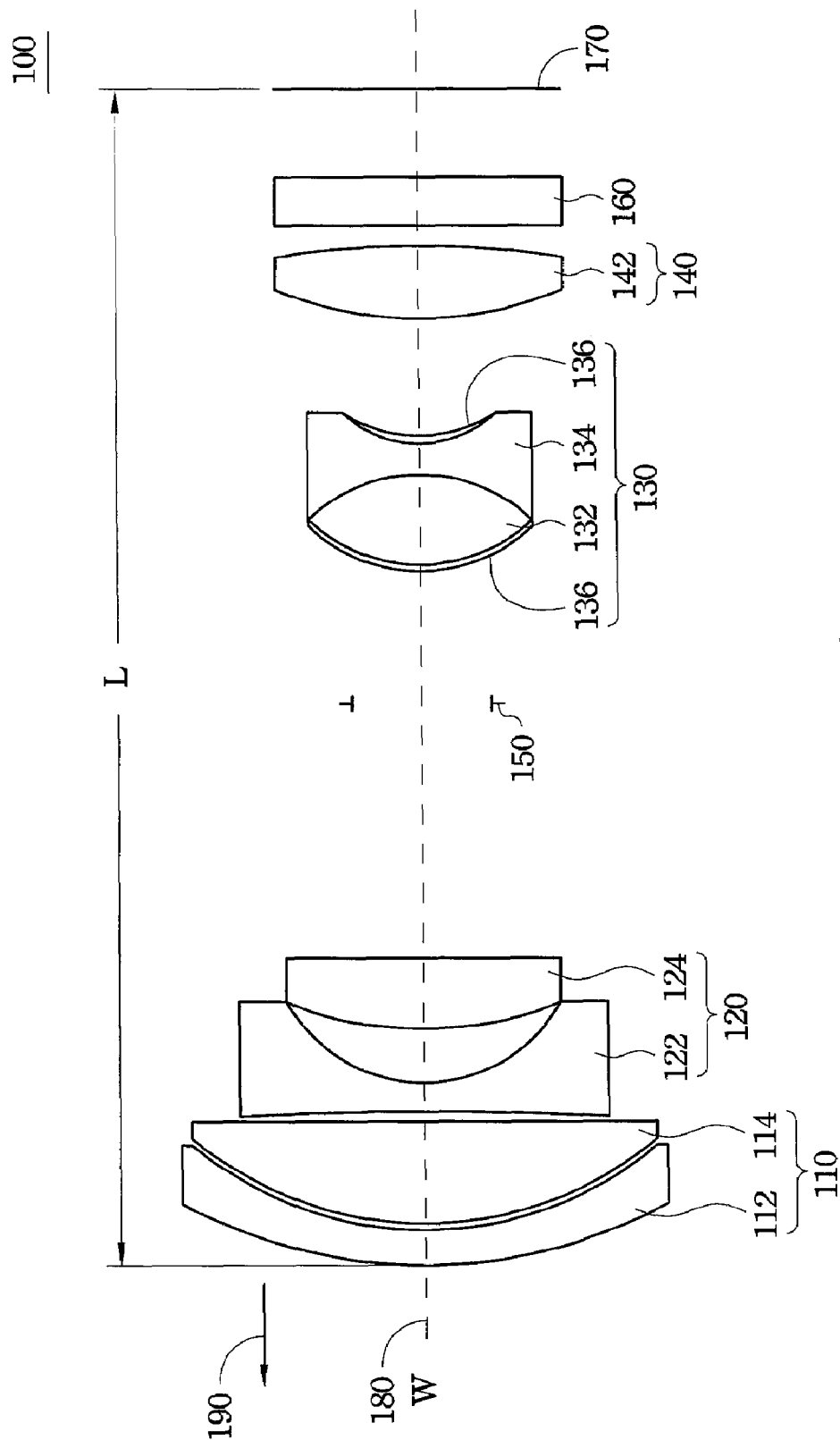
FIG. 1A depicts a embodiment of the zoom lens system at the wide status.

Reference will now be made in detail to the present embodiments of the invention, examples of which are illustrated in the accompanying drawings. Wherever possible, the same reference numbers are used in the drawings and the description to refer to the same or like parts.

The embodiment of the invention has four lens assemblies to increase the image quality. Some lenses are made of plastic to reduce cost. Someone skilled in the art could change the material of the lenses and adjust the optical parameters to satisfy the variation of the application.

Please refer to FIG. 1. FIG. 1 depicts the embodiment of the zoom lens system 100 at wide status. When the zoom lens system 100 is arranged on the camera, the image side 170 is an image sensor. The zoom lens system 100 from the object side 190 to the image side 170 on the optical axis 180 comprises a first lens group 110 with positive optical power, a second lens group 120 with negative optical power, a third lens group 130 with positive optical power, and a fourth lens group 140 with positive optical power. The first lens group 110 includes a first meniscus lens 112 and a second convex lens 114. The first meniscus lens 112 is placed close to the object side 190. The first meniscus lens 112 and the second convex lens 114 are separated at a predetermined distance, that is the first meniscus lens 112 and the second convex lens 114 are not bounded and are separated by a predetermined distance to reduce the probability of generating a ghost image.

The second lens group 120 includes a third concave lens 112 and a fourth convex lens 124. The third concave lens 112 is placed closer to the object side 190 than the fourth convex lens 124.

A fifth biconvex lens 132 and a sixth biconcave lens 134 make up the third lens group 130. The fifth biconvex lens 132 is placed closer to the object side 190 than the sixth biconcave lens 134, and the fifth biconvex lens 132 is adhering to the sixth biconcave lens 134. The fourth lens group 140 is composed of a seventh plastic lens 142. The seventh plastic lens has at least one aspheric surface. Moreover, the zoom lens system 100 further comprises an aperture stop 150 arranged between the second lens group 120 and the third lens group 130.

Figure 1B:
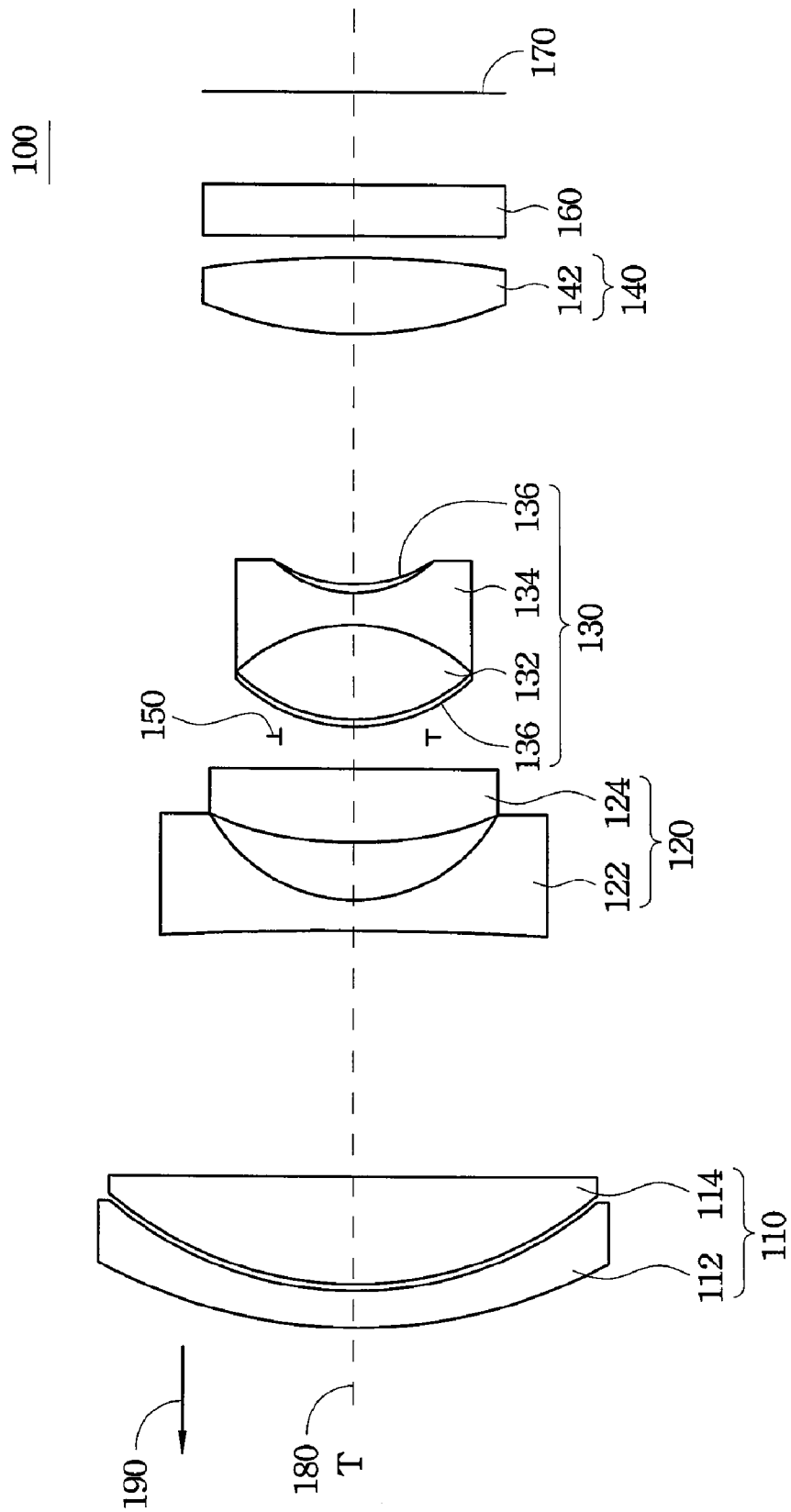
FIG. 1B depicts the embodiment of the zoom lens system at telephoto status.

Please refer to FIG. 1B. FIG. 1B depicts the zoom lens system 100 at telephoto status. When the zoom lens system 100 is zooming, the second lens group 120 is moved toward the image side and the third lens group 130 is moved toward the object side. When the zoom lens system 100 focuses from the wide status to the telephoto status, the second lens group 120 moves towards the image side 170 and the third lens group 130 moves towards the object side 190. Moreover, during the zooming process, the positions of the first lens group 110 and the aperture stop 150 on the optical axis are fixed.

The object side surface of the first meniscus lens 122 is curved outwardly toward the object side 190. During the zooming process, the position of the first lens group 110 is fixed. The first lens group 110 is made of glass, and the first meniscus lens 112 and the second convex lens 124 are spherical lenses. In another embodiment, the first lens group 110 may make of plastic, and the first lens group 110 includes at least one aspheric surface.

The object side surface of the fifth biconvex lens 132 adheres to a first resin material to form an eighth hybrid lens having an aspheric surface and the image side surface of the sixth biconcave lens 134 adheres to a second resin material to form an ninth hybrid lens having an aspheric surface. In another embodiment, the fifth biconvex lens 132 and the sixth biconcave lens 134 are glass molding lenses, and the object side surface of the fifth biconvex lens 132 and the image side surface of the sixth biconcave lens 134 are aspheric.

When the zoom lens system 100 is adjusting focus, the seventh plastic lens 142 of the fourth lens group 140 is moved axially on the optical axis 180. When the zoom lens system 100 is shot at a close range, the fourth lens group 140 is moved toward the third lens group 130. Moreover, the fourth lens group 140 may move axially on the optical axis 180 during the zooming process, or after the zooming process to compensate the zooming system/process.

The zoom lens system 100 of the embodiment further satisfies the following condition:

$$\frac{Y \times L}{2 \times f_W \times f_T} \leq 1.06$$

wherein Y is a maximum diagonal length of the image side 170, L is a total track length of the zoom lens system 100, $f_W$ is a focal length of the zoom lens system 100 at the wide status, $f_T$ is a focal length of the zoom lens system 100 at the telephoto status.

The zoom lens system 100 further comprises a filter 160 arranged between the fourth lens group 140 and the image side 170.

In order to emphasize advantages and practicability of the zoom lens system 100, an embodiment is designed according to the conditions described above, and the optical parameters and optical characteristics of this embodiment are described herein.

FIRST EMBODIMENT

Table 1 sequentially lists the optical parameters of the faces of the zoom lens system in the order from the object side to the image side. Wherein the STO. is aperture stop, and FS1 and FS2 are the faces of the filter.

TABLE 1

| Surface Face Number | Curvature Radius (mm) | Distance(mm) | Refraction Index(Nd) | Abbe Number(Vd) |
|---|---|---|---|---|
| S11 | 2.1766 | 0.14 | 1.84666 | 23.80 |
| S12 | 1.4838 | 0.02 | | |
| S21 | 1.4928 | 0.4 | 1.713000 | 53.90 |
| S22 | 37.5361 | D1 | | |
| S31 | −8.8258 | 0.12 | 1.755000 | 52.30 |
| S32 | 0.6649 | 0.195 | | |
| S41 | 1.4689 | 0.3 | 1.607265 | 26.65 |
| S42 | 6.2687 | D2 | | |
| STO. | INF. | D3 | | |
| S511 | 0.6068 | 0.016 | 1.519400 | 52.10 |
| S51(S512) | 0.61336 | 0.36 | 1.743200 | 49.30 |
| S52(S61) | −0.6797 | 0.14 | 1.666800 | 33.00 |
| S62(S621) | 0.53103 | 0.016 | 1.519400 | 52.10 |
| S622 | 0.71619 | D4 | | |
| S71 | 1.7511 | 0.28 | 1.525383 | 56.36 |
| S72 | −8.2379 | 0.1 | | |
| FS1 | INF. | 0.16 | 1.516330 | 64.1 |
| FS2 | INF. | 0.6 | | |
| IMA. | | | | |

When the zoom lens system is zooming, the distances D1, D2, D3, and D4 are changed. Table 2 lists the distance parameters (D1, D2, D3, and D4) at the wide status, the telephoto status, and the middle of the two.

TABLE 2

| State | D1 | D2 | D3 | D4 |
|---|---|---|---|---|
| W (f = 1.0) | 0.06379 | 1.07930 | 0.54716 | 0.48140 |
| M (f = 1.6) | 0.34041 | 0.76618 | 0.15329 | 0.87526 |
| T (f = 3.0) | 1.06432 | 0.10000 | 0.10000 | 0.92759 |

According to Table 1 and Table 2, the total track length of the zoom lens system L is 5 mm, the maximum diagonal length of the image side Y is 1.25 mm, the focal length of the zoom lens system at the wide status $f_W$ is 1.0 mm, the focal length of the zoom lens system at the telephoto status $f_T$ is 3.0 mm. Hence, the first embodiment satisfies the specific formula described above.

The zoom lens system of this embodiment includes aspheric surfaces. The surfaces are typically designed such that their profile is described by the equation $$z = \frac{ch^2}{1 + [1 - (k+1)c^2h^2]^{1/2}} + Ah^4 + Bh^6 + Ch^8 + Dh^{10}$$

wherein z is the sag value of the lens which is the concave degree of the lens, c is the reciprocal of the radius of curvature of the lens, h is the distance between the lens surface and the optical axis, k is the conic coefficient, and A to D describe the high-level aspheric coefficients. The conic coefficients and the high-level aspheric coefficients of the aspheric surfaces are sequentially listed in the Table 3 and Table 4.

TABLE 3

| Surface Number | Conic Coefficient | A | B |
|---|---|---|---|
| S41 | 0 | $1.6578 \times 10^{-1}$ | $8.25217 \times 10^{-1}$ |
| S42 | 0 | $-7.3976 \times 10^{-2}$ | $-2.45392 \times 10^{-1}$ |
| S511 | −0.43875 | $2.42684 \times 10^{-1}$ | $4.89816 \times 10^{-1}$ |
| S622 | 0 | 2.56509 | 1.40301 |
| S72 | −8.92083 | $5.50102 \times 10^{-2}$ | $-9.30956 \times 10^{-1}$ |

TABLE 4

| Surface Number | C | D |
|---|---|---|
| S41 | −2.0401 | 5.81301 |
| S42 | $9.986 \times 10^{-1}$ | −1.91244 |
| S511 | $-1.18838 \times 10^{1}$ | $2.60941 \times 10^{1}$ |
| S622 | $8.35819 \times 10^{1}$ | $-1.76246 \times 10^{2}$ |
| S72 | 2.20433 | −1.99789 |

Figure 2A:
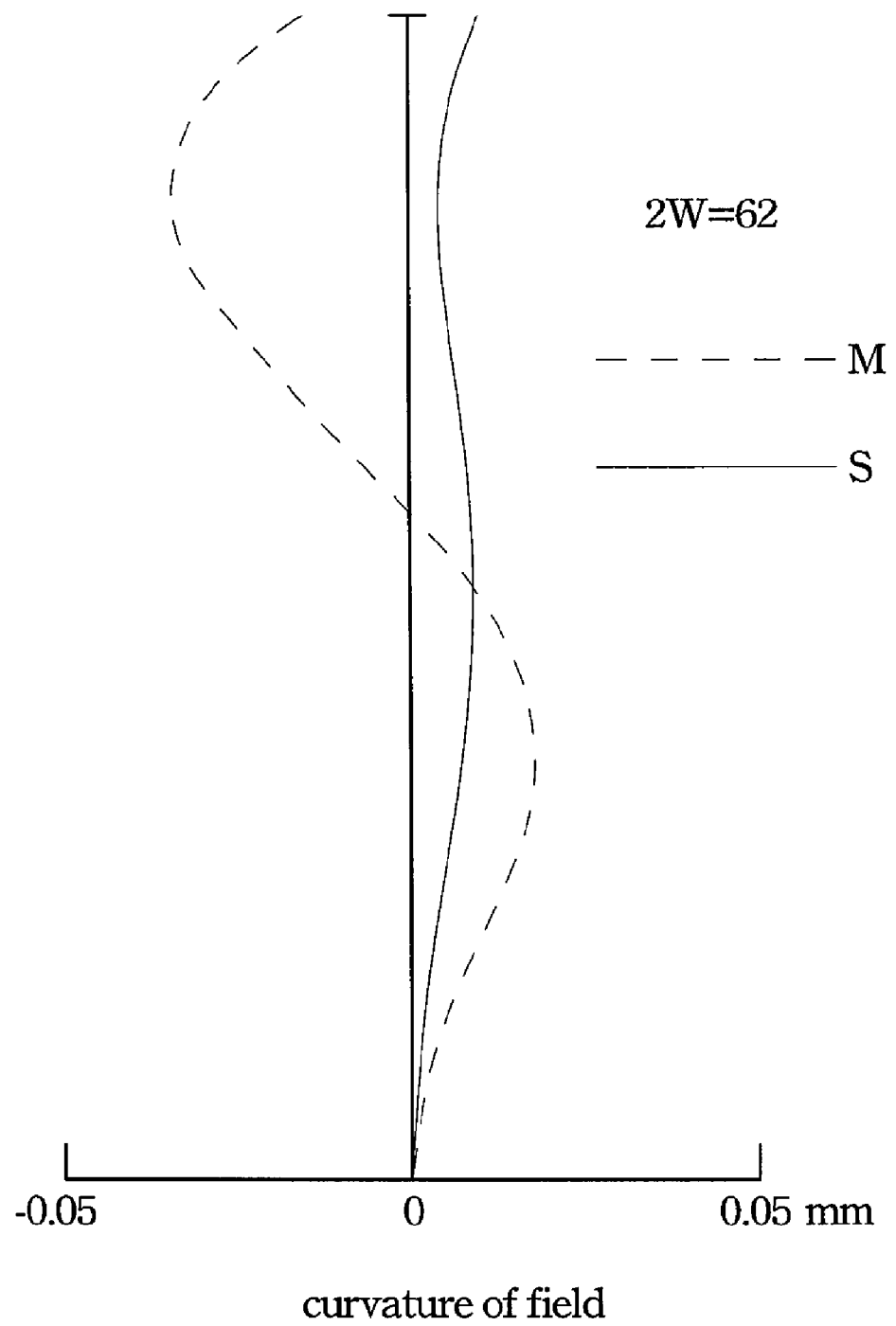
FIGS. 2A to 2C depict the curvature of filed at different field angles of the first embodiment of the invention.
Figure 2B:
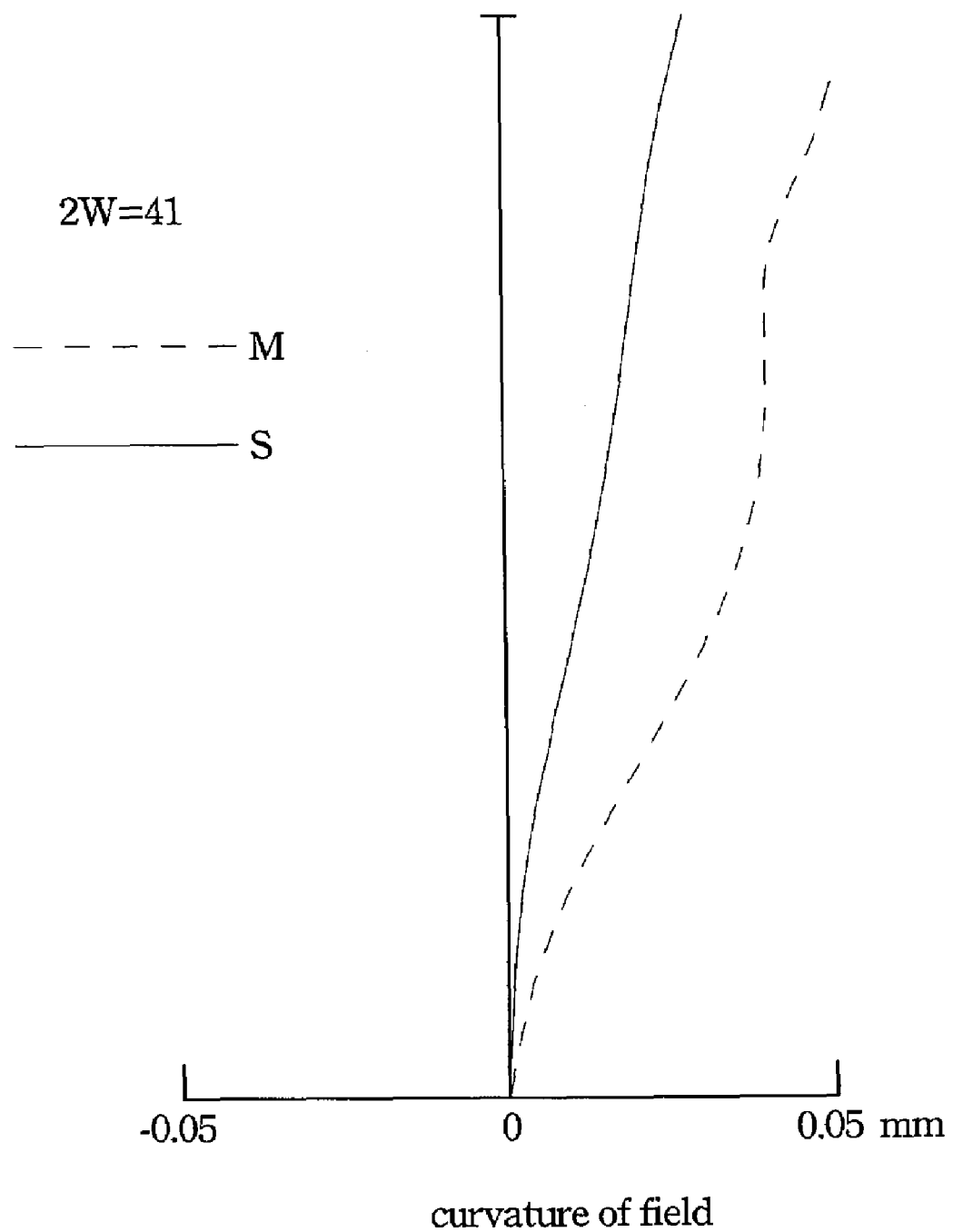
Figure 2C:
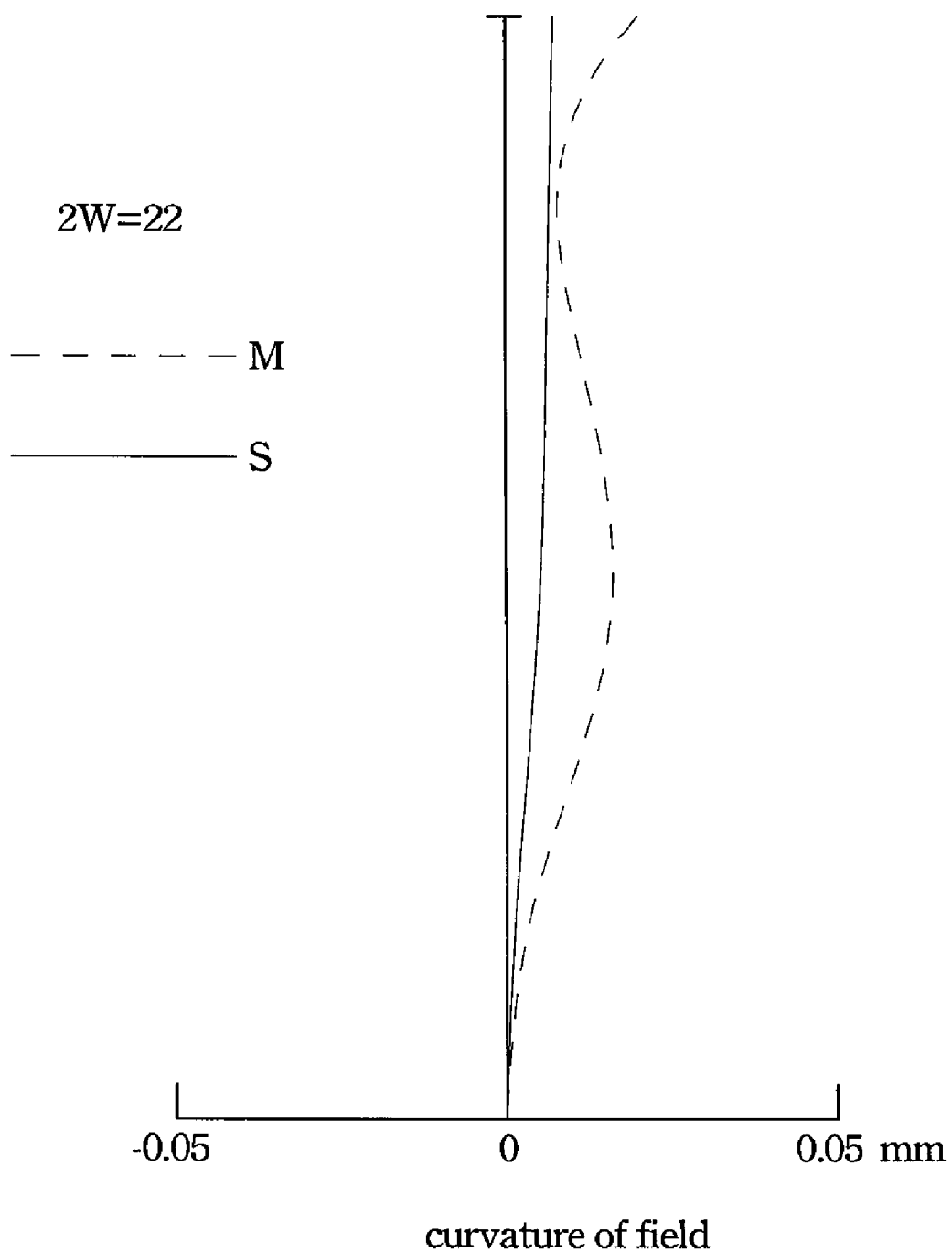

Now, please refer to FIG. 2A to FIG. 2C. These figures depict the curvature of field at different field angles of this embodiment. The field angle is 62 degrees in FIG. 2A, is 41 degrees in FIG. 2B, and 22 degrees in FIG. 2C. Label M is indicated of the Meridian Ray of the incidence light. Label S is indicated of the Sagittal Ray of the incident light. The horizontal axis is indicated as the distance between the image point and the ideal image surface. The longitudinal axis is shown as the ideal image height or incidence angle. Accordingly, the curvature of field of the zoom lens system between the wide status and the telephoto status is less than 0.05 mm.

Figure 3A:
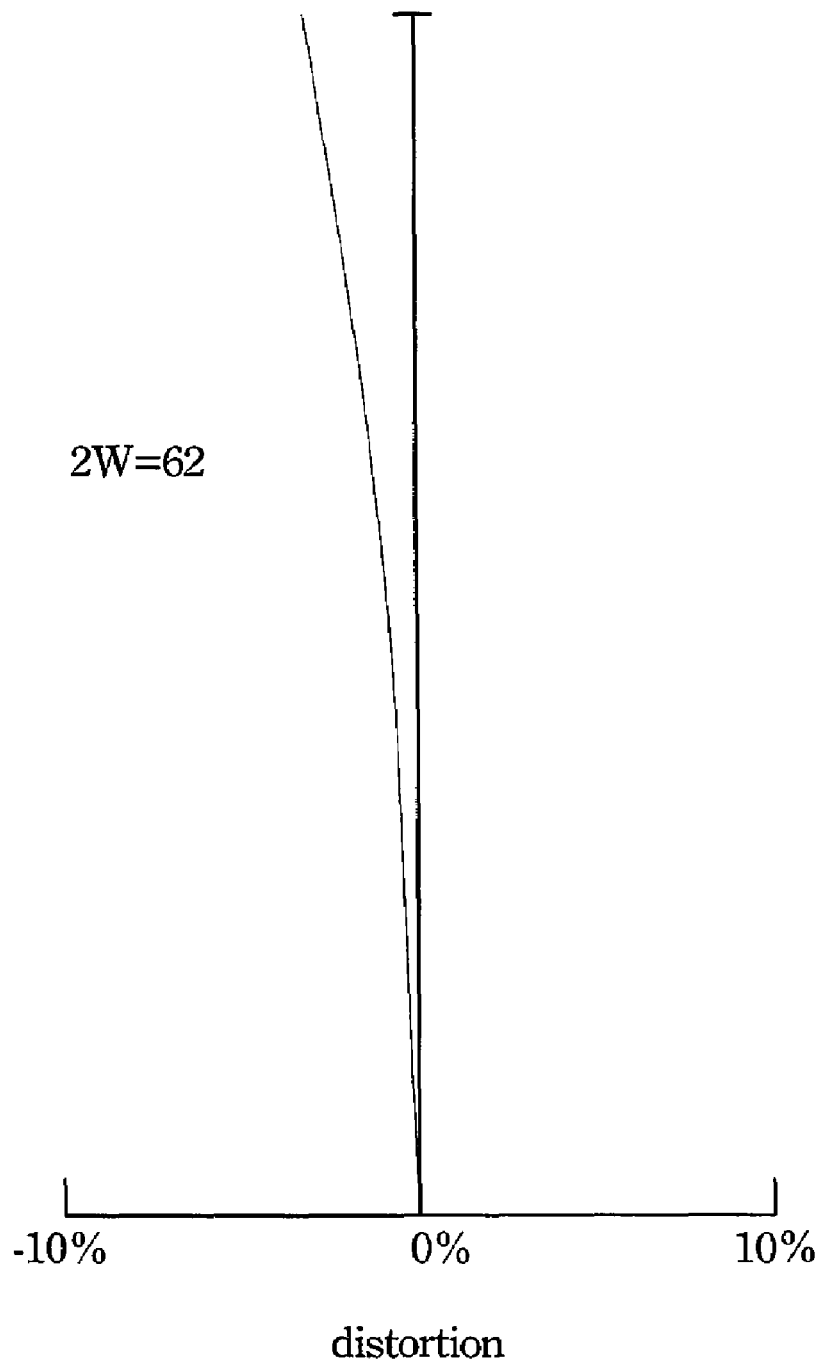
FIGS. 3A to 3C depict the distortion at different field angles of the first embodiment of the invention.
Figure 3B:
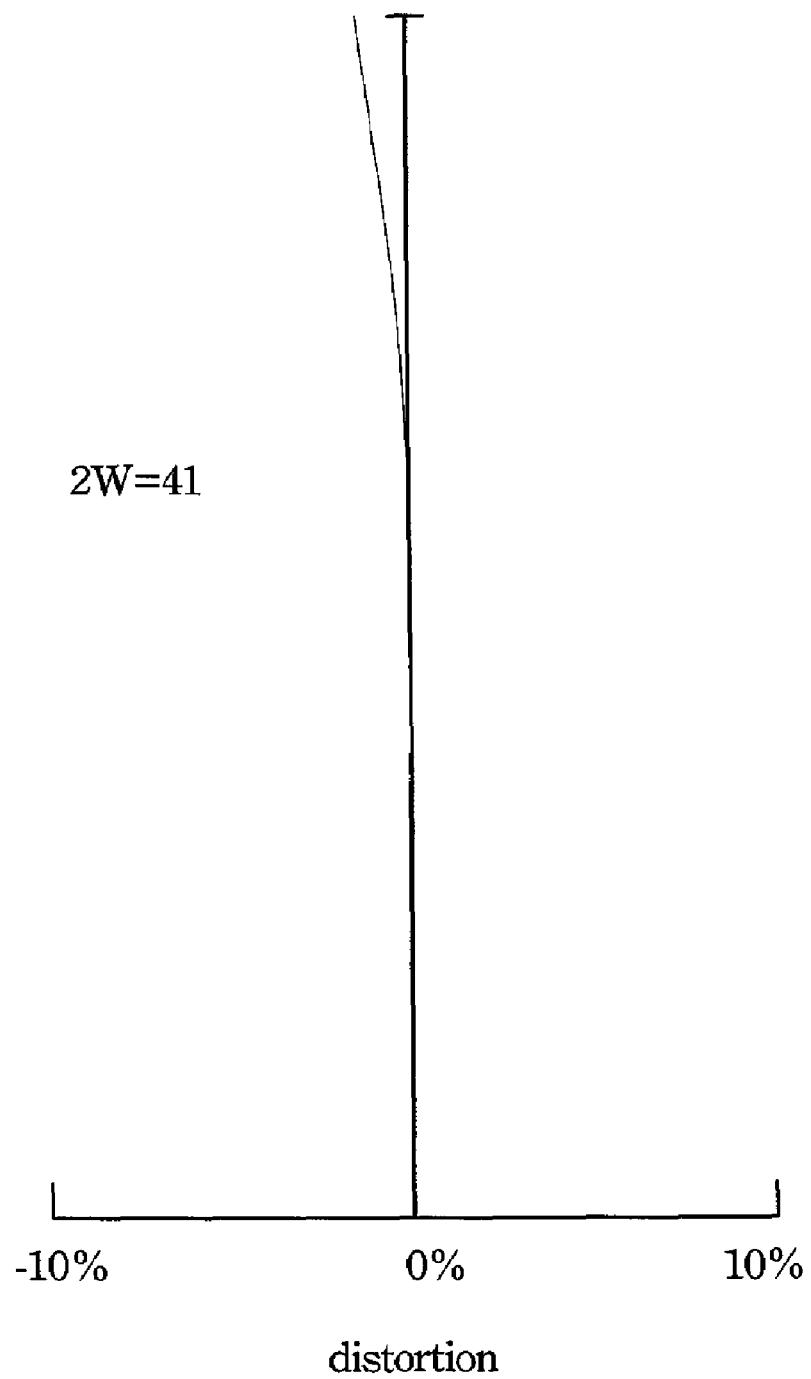
Figure 3C:
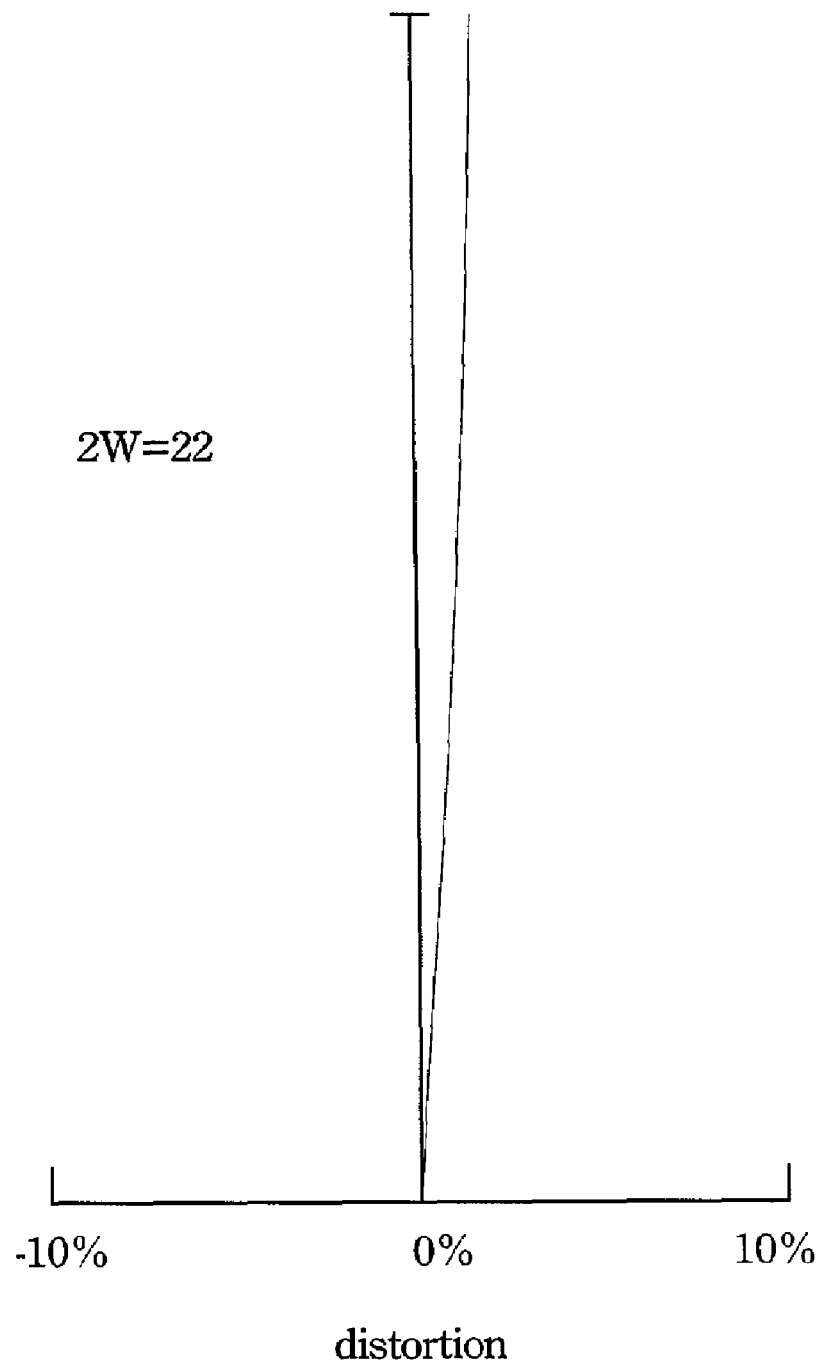

FIGS. 3A to 3B depict the distortion at different field angles of this embodiment. The field angle is 62 degrees in FIG. 3A, 41 degrees in FIG. 3B, and 22 degrees in FIG. 3C. The horizontal axis is indicated as the percentage difference between the image point and the ideal point. The longitudinal axis is shown as the ideal image height or incidence angle. Accordingly, the distortion of the zoom lens system between the wide status and telephoto status is less than 5%.

Figure 4A:
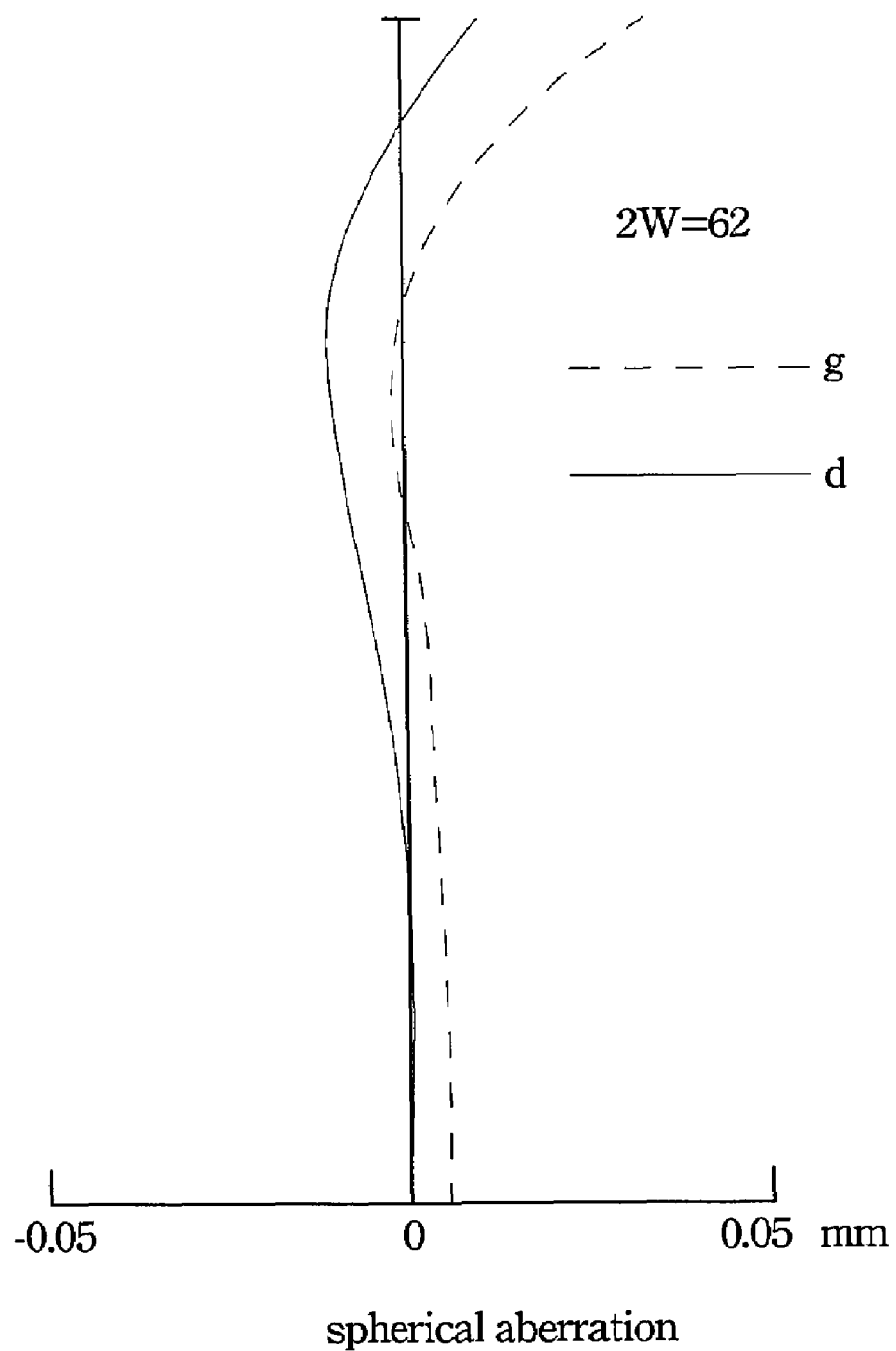
FIGS. 4A to 4C depict the spherical aberration at different field angles of the first embodiment of the invention.
Figure 4B:
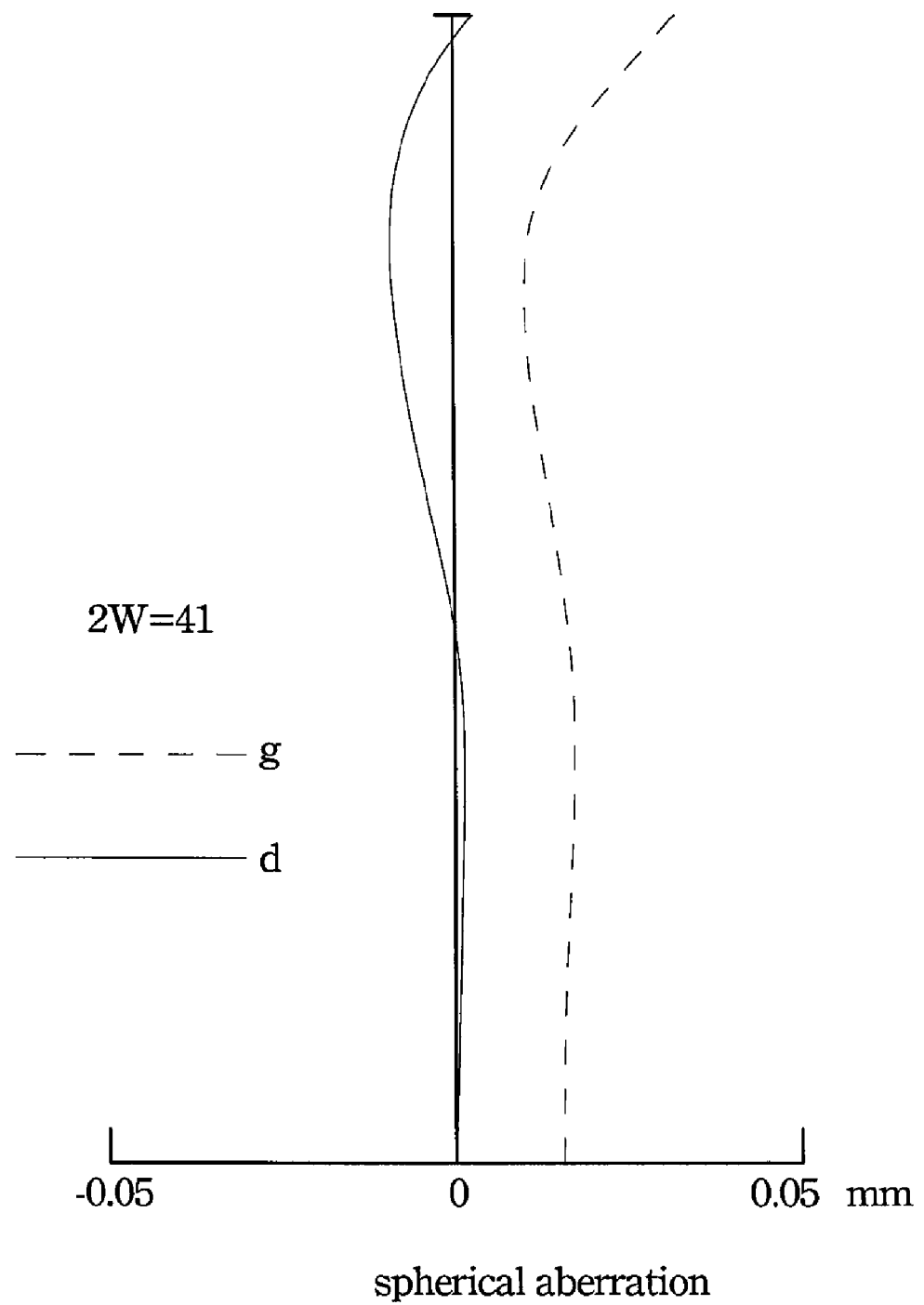
Figure 4C:
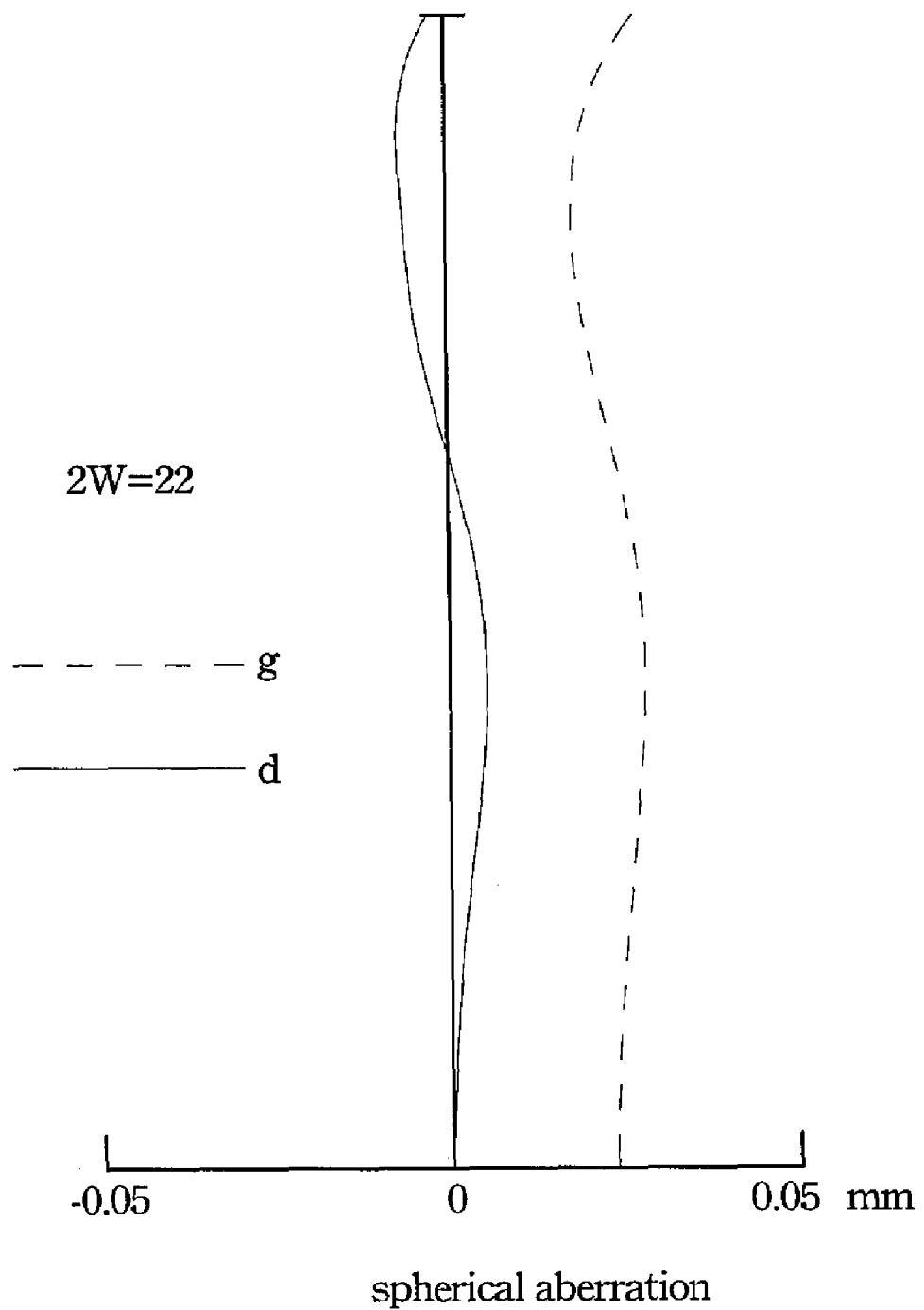

FIG. 4A to FIG. 4C show the spherical aberration at different field angles of the zoom lens system. The field angle is 62 degrees in FIG. 4A, 41 degrees in FIG. 4B, and 22 degrees in FIG. 4C. Accordingly, the spherical aberration of the zoom lens system between the wide status and the telephoto status is less than 0.05 mm.

Figure 5A:
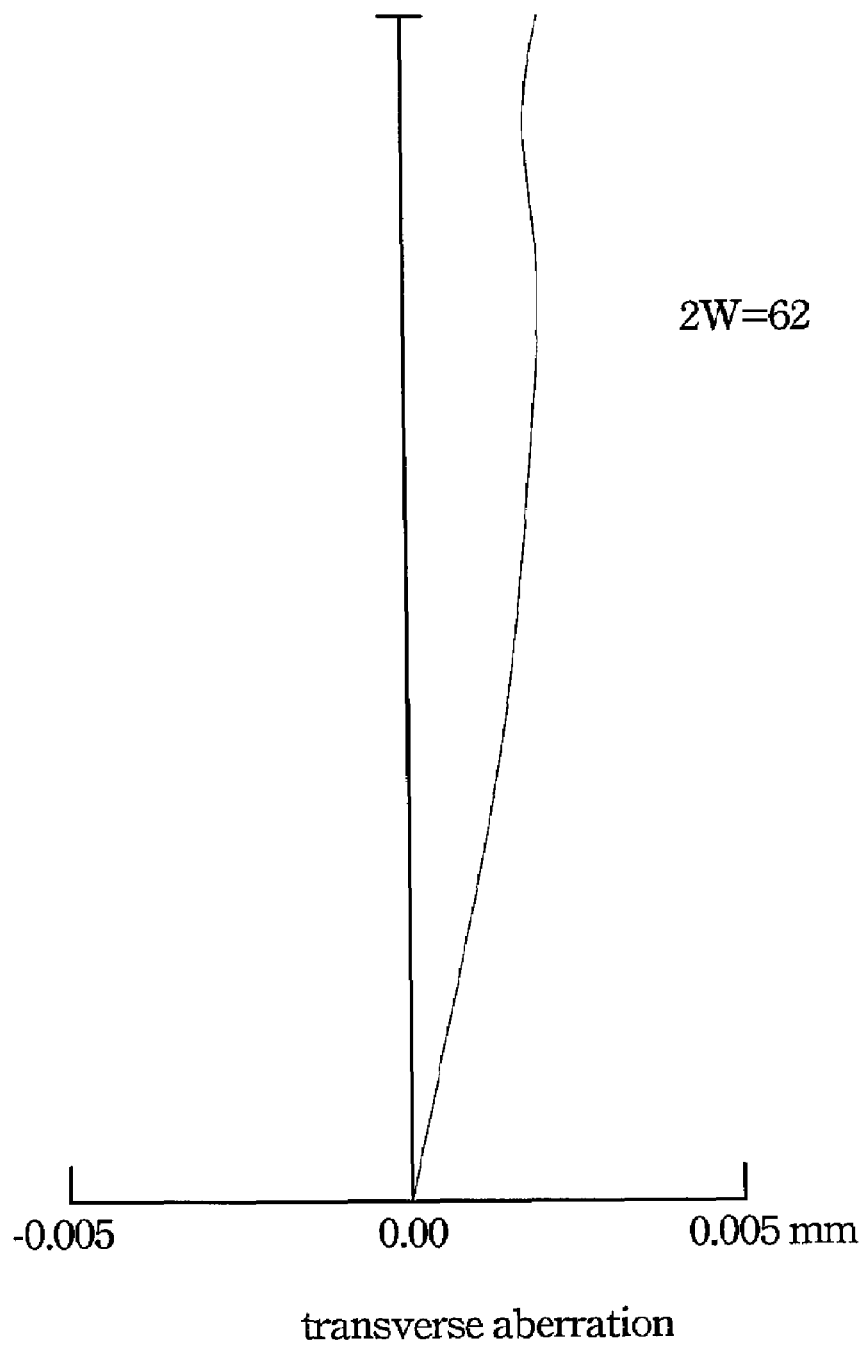
FIGS. 5A to 5C depict the transverse aberration at different filed angles of the first embodiment of the invention.
Figure 5B:
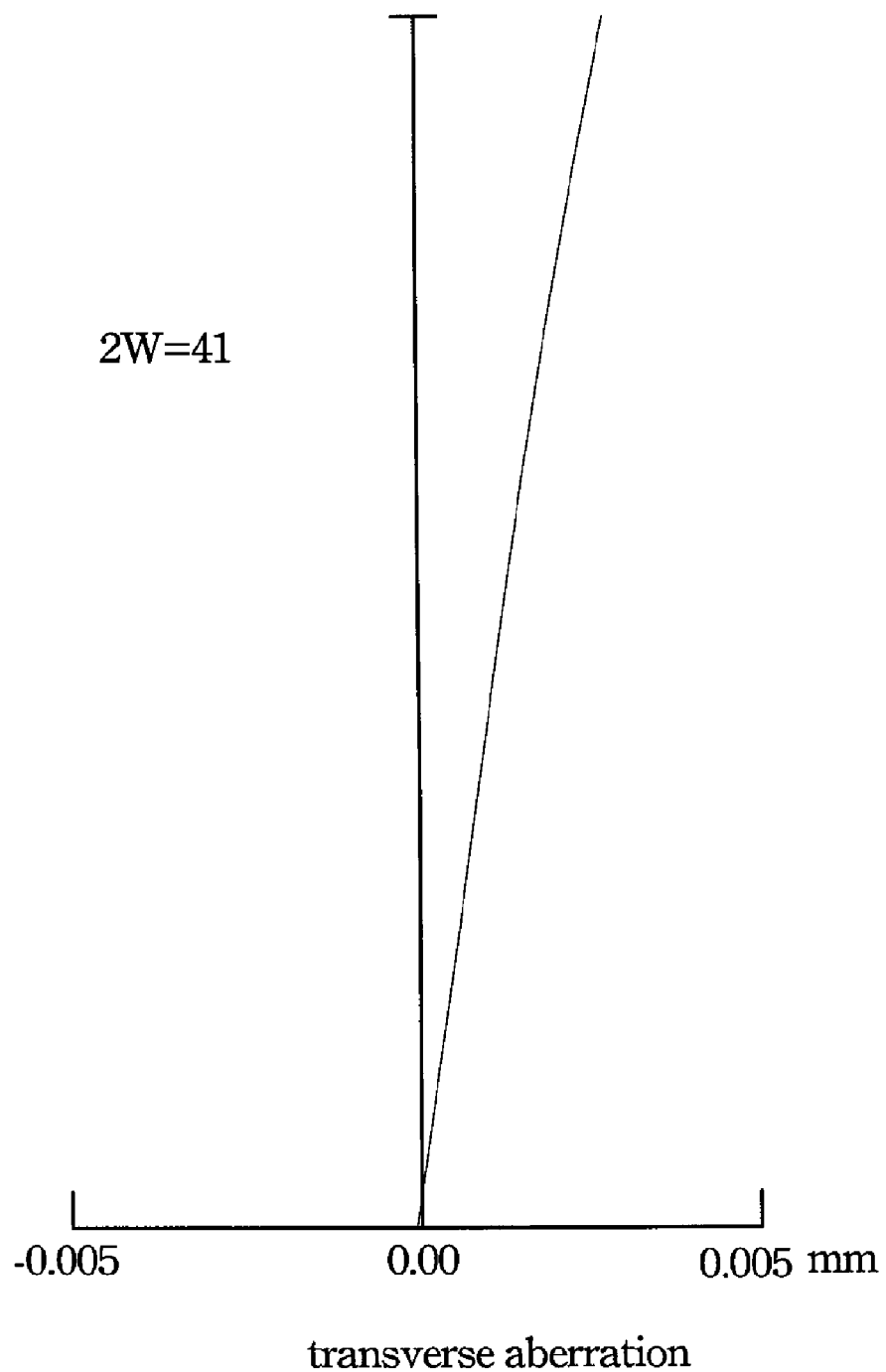
Figure 5C:
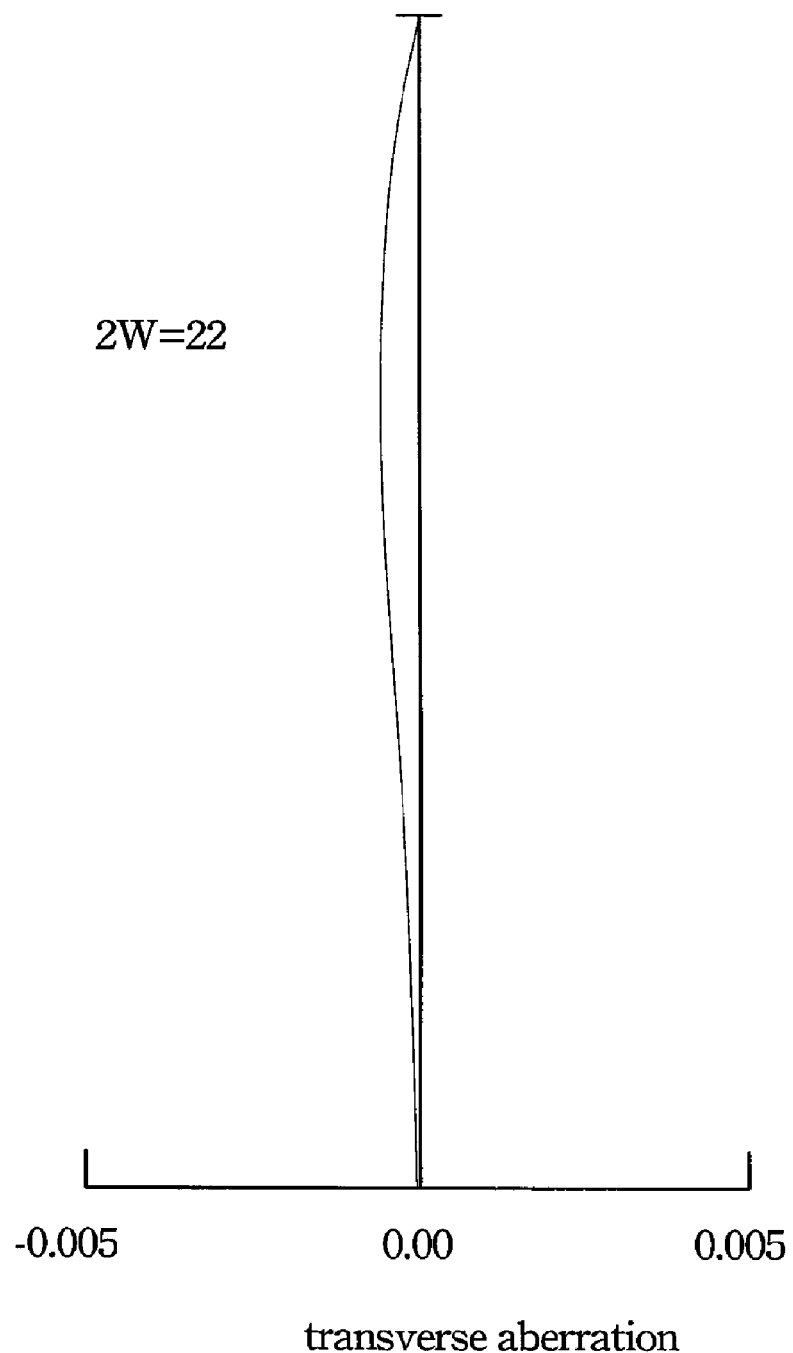
Figure 6A:
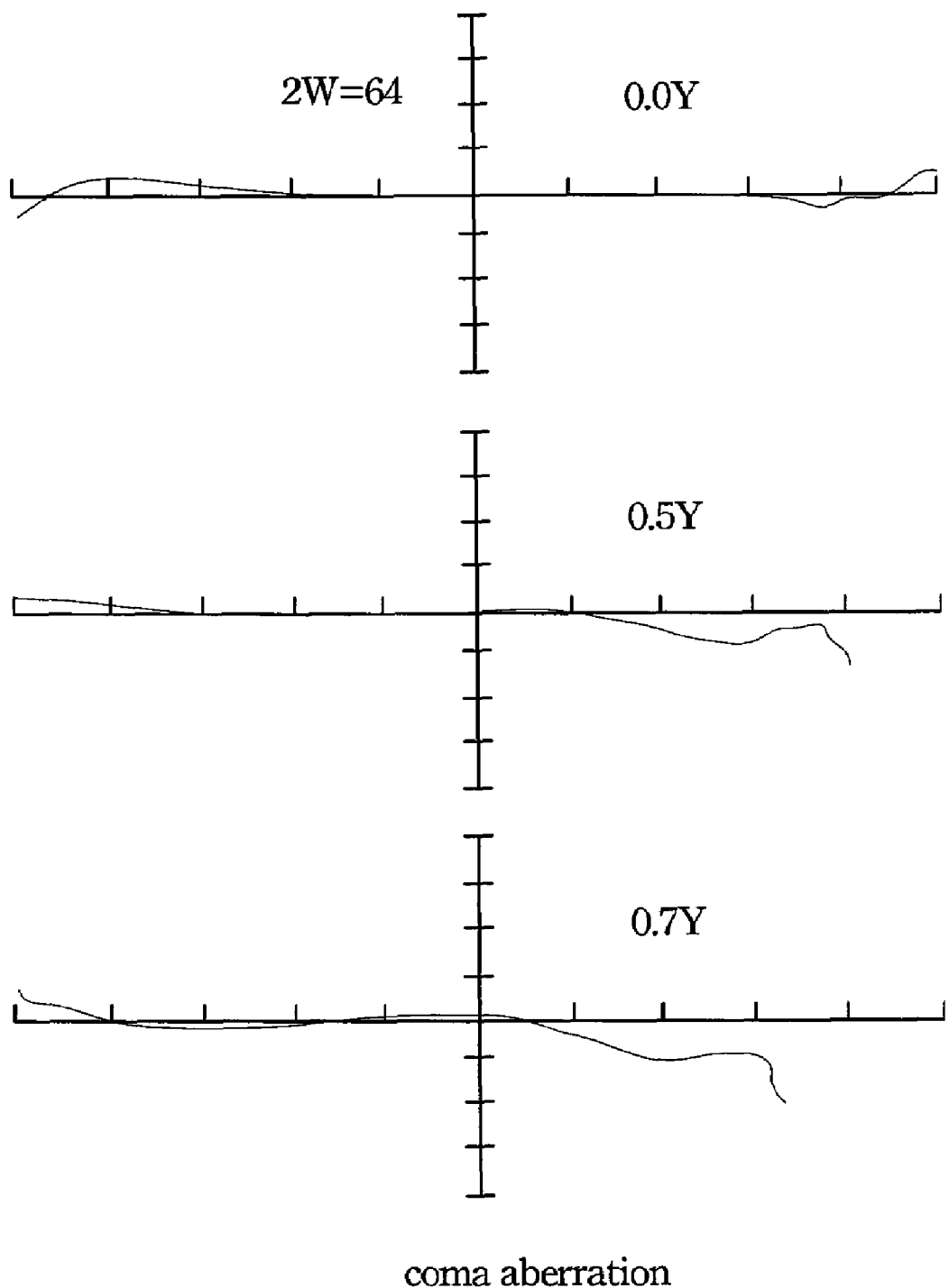
FIGS. 6A to 6C depict the coma aberration at different field angles of the first embodiment of the invention.
Figure 6B:
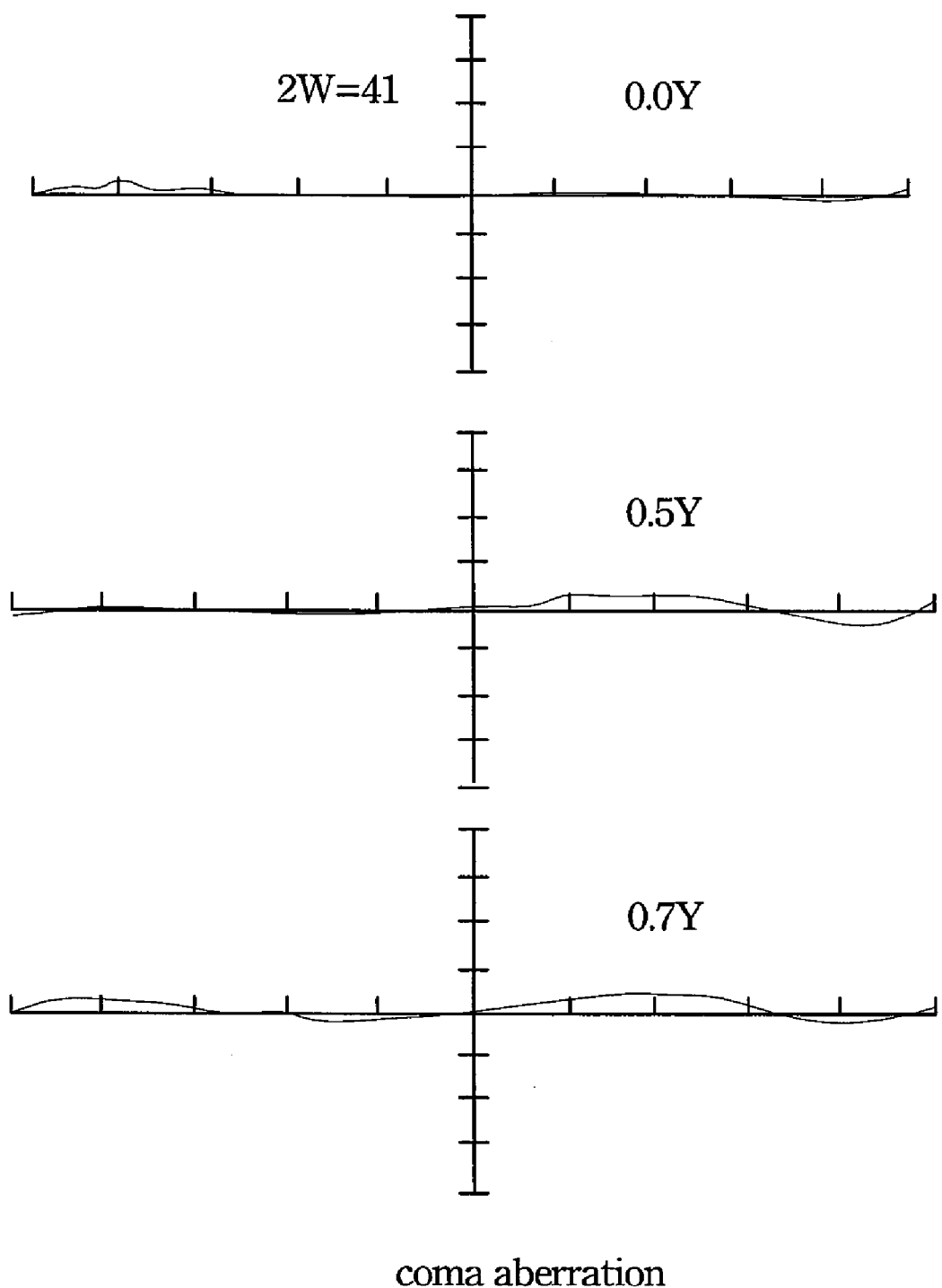
Figure 6C:
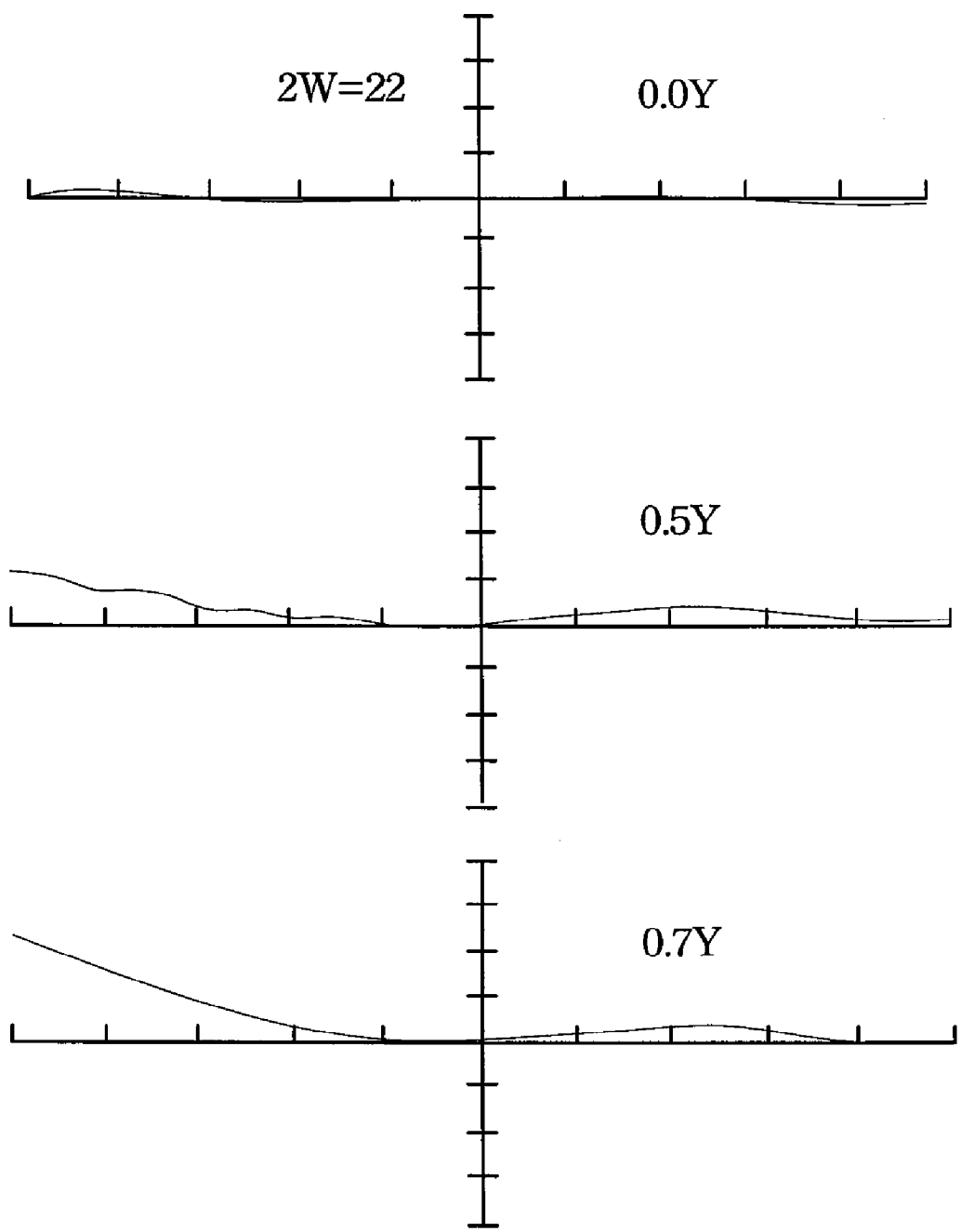

FIG. 5A to FIG. 5C depict the transverse aberration at different field angles of the zoom lens system. The field angle is 62 degrees in FIG. 5A, 41 degrees in FIG. 5B, and 22 degrees in FIG. 5C. Accordingly, the transverse aberration of the zoom lens system between the wide status and telephoto status is less than 0.005 mm FIG. 6A to FIG. 6C depict the coma aberration at different field angles of the zoom lens system. In FIG. 6A, the coma aberrations are obtained at the image height of 0Y, 0.5Y and 0.7Y separately, and the field angle is 64 degrees. In FIG. 6B, the coma aberrations are obtained at the image height of 0Y, 0.5Y and 0.7Y separately, and the field angle is 41 degrees. In FIG. 6C, the coma aberrations are obtained at the image height of 0Y, 0.5Y and 0.7Y separately, and the field angle is 22 degrees. Accordingly, the coma aberration of the zoom lens system between the wide status and the telephoto status does not affect the image seriously in most situations.

The zoom lens system of the embodiment includes four lens groups to increase the image quality. The lenses of the first lens group have a predetermined distance between them to reduce the probability of generating a ghost image. Moreover, some lenses are made of plastic to reduce the cost of the zoom lens system. Furthermore, the total track length of the optical system is reduced based on the appropriate optical parameters.

Although the present invention has been described in considerable detail with reference to certain embodiments thereof, other embodiments are possible. Therefore, their spirit and scope of the appended claims should no be limited to the description of the embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A zoom lens system, from an object side to an image side on an optical axis comprising:
   a first lens group with positive optical power consisted of two lenses without binding together and having a predetermined distance therebetween;
   a second lens group with negative optical power;
   a third lens group with positive optical power comprising, in order from the object side to the image side, a fifth biconvex lens and a sixth biconcave lens, wherein the fifth biconvex lens is adhering to the sixth biconcave lens;
   a fourth lens group with positive optical power; and
   an aperture stop arranged between the second lens group and the third lens group;
   wherein when the zoom lens system is zooming from wide status to telephoto status, the second lens group is moved toward the image side and the third lens group is moved toward the object side, the positions of the first lens group and the aperture stop on the optical axis are fixed;
   wherein the zoom lens system satisfies the following condition:

$$\frac{Y \times L}{2 \times f_W \times f_T} \leq 1.06$$

wherein Y is a maximum diagonal length of the image side, L is a total track length of the zoom lens system, $f_W$ is a focal length of the zoom lens system at a wide status, $f_T$ is a focal length of the zoom lens system at a telephoto status.

2. The zoom lens system of claim 1, wherein the two lenses of the first lens group assembled in the order from the object side to the image side are a first meniscus lens and a second convex lens, and an object side surface of the first meniscus lens is curved outwardly toward the object side.

3. The zoom lens system of claim 2, wherein at least one lens of the first lens group is made of glass, and the first meniscus lens and the second convex lens are spherical lenses.

4. The zoom lens system of claim 2, wherein at least one lens of the first lens group is made of plastic, and the first lens group has at least one aspheric surface.

5. The zoom lens system of claim 1, wherein the second lens group sequentially assembled from the object side to the image side has a third concave lens and a fourth convex lens.

6. The zoom lens system of claim 5, wherein the fourth convex lens is made of plastic, and the Abbe Number is less than 30.

7. The zoom lens system of claim 6, wherein the fourth convex lens has at least one aspheric surface.

8. The zoom lens system of claim 1, wherein an object side surface of the fifth biconvex lens adheres to a first resin material to form an eighth hybrid lens having an aspheric surface, and an image side surface of the sixth biconcave lens adheres to a second resin material to form a ninth hybrid lens having an aspheric surface.

9. The zoom lens system of claim 1, wherein the fifth biconvex lens and the sixth biconcave lens are glass molding lenses, and an object side surface of the fifth biconvex lens and an image side surface of the sixth biconcave lens are aspheric.

10. The zoom lens system of claim 1, wherein the fourth lens group is composed of a plastic lens, the plastic lens has at least one aspheric surface.

11. The zoom lens system of claim 10, while the zoom lens system is adjusting focus, the fourth lens group is moved axially.

12. A zoom lens system, from an object side to an image side on an optical axis comprising:
a first lens group with positive optical power comprising, in order from the object side to the image side, a first meniscus lens and a second convex lens, wherein an object side surface of the first meniscus lens is curved outwardly toward the object side, and the first meniscus lens and the second convex lens are separated by a predetermined distance;
a second lens group with negative optical power comprising, in order from the object side to the image side, a third concave lens and a fourth convex lens;
a third lens group with positive optical power comprising, in order from the object side to the image side, a fifth biconvex lens and a sixth biconcave lens, wherein the fifth biconvex lens is adhering to the sixth biconcave lens;
a fourth lens group with positive optical power composed of a seventh plastic lens, the seventh plastic lens having at least one aspheric surface; and
an aperture stop arranged between the second lens group and the third lens group;
wherein the zoom lens system satisfies the following condition:

$$\frac{Y \times L}{2 \times f_W \times f_T} \leq 1.06$$

Y is a maximum diagonal length of the image side, L is a total track length of the zoom lens system, $f_W$ is a focal length of the zoom lens system at a wide status, $f_T$ is a focal length of the zoom lens system at a telephoto status;
wherein while the zoom lens system is zooming from wide status to telephoto status, the second lens group is moved toward the image side and the third lens group is moved toward the object side, and the positions of the first lens group and the aperture stop on the optical axis are fixed.

13. The zoom lens system of claim 12, wherein at least one lens of the first lens group is made of glass, and the first meniscus lens and the second convex lens are spherical lenses.

14. The zoom lens system of claim 12, wherein at least one lens of the first lens group is made of plastic, and the first lens group has at least one aspheric surface.

15. The zoom lens system of claim 12, wherein the fourth convex lens is made of plastic, and the Abbe Number is less than 30.

16. The zoom lens system of claim 12, wherein an object side surface of the fifth biconvex lens adheres to a first resin material to form a eighth hybrid lens having an aspheric surface and an image side surface of the sixth biconcave lens adheres to a second resin material to form a ninth hybrid lens having an aspheric surface.

17. The zoom lens system of claim 12, wherein the fifth biconvex lens and the sixth biconcave lens are glass molding lenses, and an object side surface of the fifth biconvex lens and an image side surface of the sixth biconcave lens are aspheric.

18. A zoom lens system, from an object side to an image side on an optical axis comprising:
a first lens group with positive optical power comprising, in order from the object side to the image side, a first meniscus lens and a second convex lens, wherein an object side surface of the first meniscus lens is curved outwardly toward the object side, and the first meniscus lens and the second convex lens are separated by a predetermined distance;
a second lens group with negative optical power comprising, in order from the object side to the image side, a third concave lens and a fourth convex lens;
a third lens group with positive optical power comprising, in order from the object side to the image side, a fifth biconvex lens and a sixth biconcave lens, wherein the fifth biconvex lens is adhering to the sixth biconcave lens;
a fourth lens group with positive optical power composed of a seventh plastic lens, the seventh plastic lens having at least one aspheric surface; and
an aperture stop arranged between the second lens group and the third lens group;
wherein the zoom lens system satisfies the following condition:

$$\frac{Y \times L}{2 \times f_W \times f_T} \leq 1.06$$

Y is a maximum diagonal length of the image side, L is a total track length of the zoom lens system, $f_W$ is a focal length of the zoom lens system at a wide status, $f_T$ is a focal length of the zoom lens system at a telephoto status;
wherein when the zoom lens system is zooming, the position of the aperture stop on the optical axis is fixed.

* * * * *